Figures 1, 2:
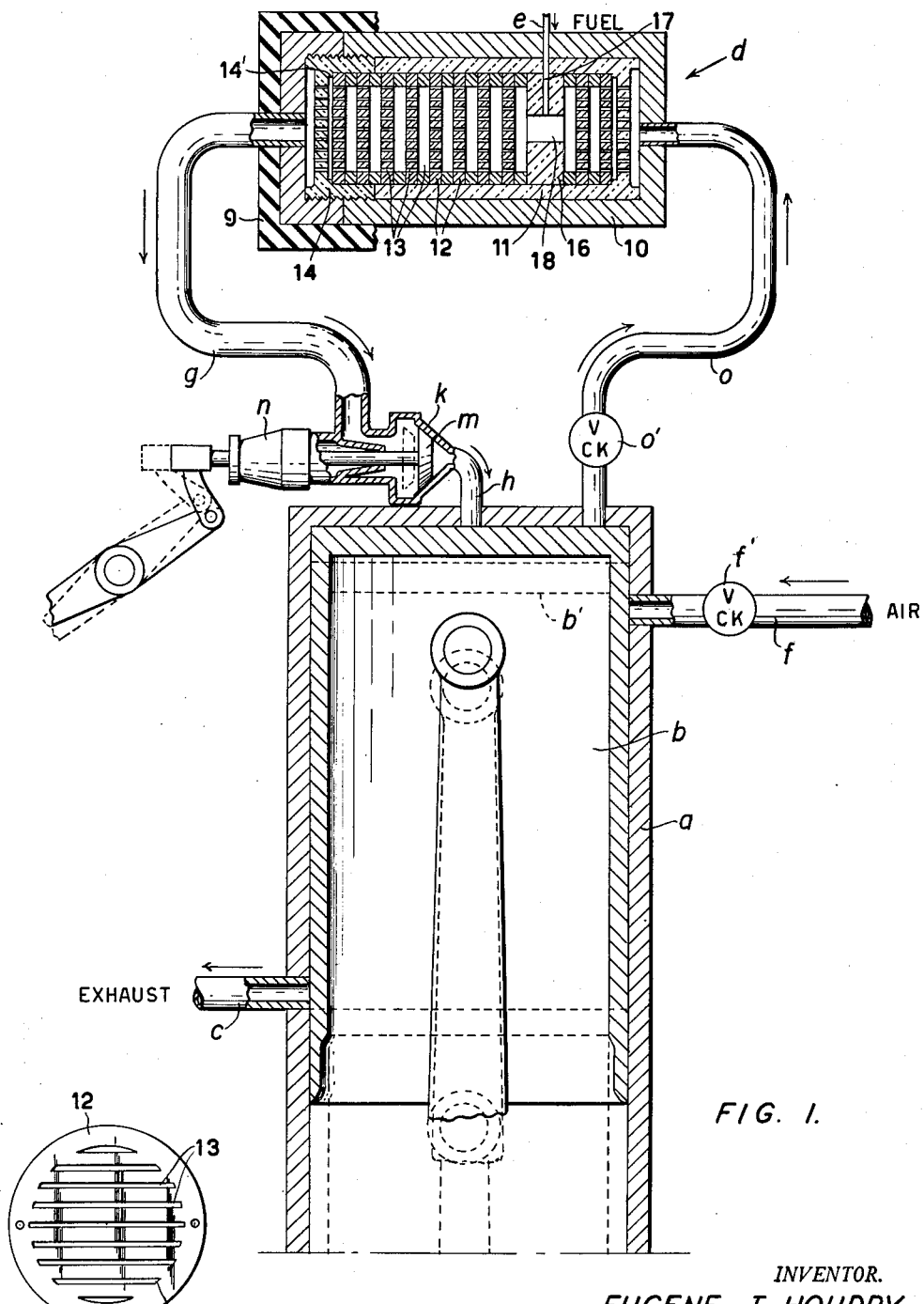

INVENTOR.
EUGENE J. HOUDRY
BY
Busser and Harding
ATTORNEYS

Patented Mar. 24, 1953

2,632,296

UNITED STATES PATENT OFFICE 2,632,296

PROCESS OF GENERATING POWER INVOLVING CATALYTIC OXIDATION

Eugene J. Houdry, Ardmore, Pa.

Application December 6, 1947, Serial No. 790,215

1 Claim. (Cl. 60—39.02)

In an application filed by me November 1, 1947, Serial No. 783,561, now Patent No. 2,624,172, I have described and claimed a radically new system of generating power which, for a given consumption of fuel, will yield a power output greatly in excess of heretofore known power systems. Another object of that invention is to admix with the fuel gases that will provide a mixture that is outside the limits of inflammability of such gases and vapors, thereby eliminating the problems of detonation, explosion and combustion. Another object of that invention is to provide a fuel-oxygen mixture which will function in engines of a compression much higher than those that are now operable with existing fuels. Various other objects and advantages are set forth in said application. Several embodiments of the invention are described and illustrated therein. Such embodiments disclose applications of the invention to the operation of turbines.

In an application filed of even date with this application, Ser. No. 790,214, I have adapted the fundamental principle disclosed in said Patent No. 2,624,172 to the driving of a piston engine and disclosed novel features not disclosed in said patent.

In both said applications the oxidation of the fuel is effected by means of an oxidizable catalyst which is oxidized and reduced and rendered effective to oxidize the fresh fuel, its activity being maintained by temperature regulation. In the specific embodiments of the invention disclosed in both applications, heat is removed from the products of oxidation to produce the energy required to generate power and unexpended energy of the products of oxidation is utilized to control the temperature of the catalytic reaction. Specifically a substantial percentage of such oxidized products are compressed and (together with an oxygen-bearing gas) recirculated to the catalyst.

While the compression of products of oxidation that have been utilized to generate power and their re-utilization, in admixture with fresh air, to jointly control the temperature of the catalyst and oxidize the fuel is of great advantage from the standpoint of economy, the operativeness of the process does not depend upon the utilization of the unexpended energy of the products of combustion; that is, the oxidized products of combustion—the motive fuel—may be exhausted in toto and the admitted oxygen-bearing gas—conveniently atmospheric air—alone admitted to the catalyst chamber, while still maintaining the catalyst at the temperature required to oxidize and reduce the catalyst to effect oxidation of the fuel and insure that such temperature conditions will be outside conditions allowing explosion of such mixture of gases and vapors under operating conditions. It is obvious, however, that such a simplification of the process disclosed in this application is relatively uneconomical, since it involves a higher fuel consumption. However, such simplified process is operative and, except for economy, has all, or most, of the advantages of a process in which the products of oxidation are reused as stated.

It is desirable, however, in such a simplified process, to provide a special arrangement and distribution of the catalyst and to regulate the loci of admission of air and fuel and the exit of oxidized fuel. Indeed, the special construction and arrangement herein described is of advantage whether or not a part of the utilized products of oxidation are compressed and returned, along with atmospheric air, to the catalyst chamber. On the other hand, so far as concerns my invention in its broader aspect, such special construction and arrangement are unnecessary.

There is shown only one embodiment of the invention. Fig. 1 is a sectional view of a piston and cylinder and a catalyst chamber, showing also the catalyst supports and catalyst units, the inlets for air and fuel and the connections from the catalyst chamber to the engine cylinder for transmission to the latter of the oxidized fuel. Fig. 2 is a detail view of one of the catalyst supports.

The cylinder $a$, within which reciprocates the piston $b$, is provided with an exhaust port $c$ for exhaust gases, $CO_2 + H_2O + N$. $d$ is a chamber containing an oxidizable catalyst which is located beyond the cylinder head. While my invention is not limited to any specific construction of catalyst chamber or to any specific arrangement of the catalyst therein or to the specific means shown for introducing fresh fuel and an oxygen bearing gas or gases, the construction and arrangement shown are preferred and are hereinafter described. At this stage of the description it suffices to say that fuel is preferably admitted direct to the catalyst chamber through the pipe $e$ and that an oxygen-bearing gas may be admitted direct to the catalyst chamber, but preferably through an inlet port $f$ in the cylinder and thence through a pipe $o$ equipped with a check valve $o'$.

A tube $g$ connects the catalyst chamber $d$ with a valve chamber $k$ mounted on the cylinder head. A tube $h$ connects the valve chamber with the upper end of the cylinder. A valve $m$ within the valve chamber $k$ is operable from mechanism $n$ driven by the engine.

In the compression stroke of the piston, the oxygen bearing gas (together with any small proportion of motive fluid that may not have been exhausted in the expansion stroke of the piston) and the vaporized fuel are compressed. In the specific process herein claimed, the oxygen bearing gas must be admitted at a rate relative to the rate of admission of the fuel so as to provide, under conditions hereinafter explained, a mixture not susceptible of oxidation by normal combustion but still susceptible of catalytic oxidation. It may be assumed that the fresh fuel is a petroleum product, which may be gasoline produced by thermal or catalytic cracking or even by simple distillation, or may be a petroleum fraction of higher boiling point, or a hydrocarbon fuel produced from a source other than petroleum. It may also be assumed that the admitted oxygen-bearing gas is fresh air.

The valve $m$ is closed throughout the major part of the compression-expansion cycle. The only time that it is opened is at about the completion of the compression stroke of the piston. At this time the motive fluid, $CO_2+H_2O+N$ enters the top of the cylinder at maximum pressure. The valve $m$ may remain open during only a minor part of the expansion stroke of the piston until the piston reaches a position more or less approximating that indicated by the broken line $b'$. Then the valve $m$ is again closed. Expansion of the gaseous mixture drives the piston to the end of its down stroke, upon which the exhaust port opens. The exhaustion of the expanded motive fluid may be nearly or quite complete, or only partial as in my copending application Serial No. 790,214. In accordance with the specific process claimed in this application, however, wherein the oxidizable mixture in contact with the oxidation catalyst is maintained outside the limits of inflammability by introducing a large excess of oxygen bearing gas into the catalytic chamber, it is contemplated that the exhaustion of the expanded motive fluid will be substantially complete. Nevertheless it should be understood that as a practical matter, absolutely complete exhaustion of the expanded motive fluid will not take place and that it may even often be desirable to purposely recirculate a relatively small amount of the expanded motive fluid to the catalyst chamber together with a large excess of fresh oxygen bearing gas. It is also essential, as hereinafter explained, that the condition in the catalyst chamber shall be such as to maintain the activity of the catalyst, render it effective to oxidize the fresh fuel, and keep the gaseous mixture outside the conditions allowing explosion of gases and vapors under operating conditions.

In order to give some idea of pressure and temperature conditions which may exist during the engine cycle, the following, although subject to rather wide variations, may be said to be typical, or at least illustrative. The engine may be assumed to be of average size, having (say) a piston displacement of 1000 cc. When the piston reaches its top dead center—the end of its compression stroke—the catalyst chamber may contain 45 cc. of gases at a pressure of about 100 atmospheres and at a temperature of about 850° C. When at this time valve $m$ is opened the oxidized fuel enters the top of the cylinder at about the above stated pressure and temperature. When the piston reaches a position indicated approximately by the broken line $b'$, the pressure in the catalyst chamber has dropped to about 66 atmospheres. Due to the expansion of the gases the pressure in the cylinder may fall slightly more rapidly than the pressure in the catalyst chamber, and may be slightly below 66 atmospheres, its temperature, due to the expansion of the gases, falling to about 650° C. When the piston reaches the end of its expansion stroke, if the exhaust port is such as to allow free exhaust, the pressure in the cylinder will have dropped nearly to atmospheric pressure and the temperature of the exhaust gases will have dropped to about 150° C.

The fresh fuel and air, either or both, may be admitted continuously or intermittently to the catalyst chamber by pumps, not shown. For example, the fuel may be admitted by means of an injection pump or pulso-pump; or the fuel and air-pipes, either or both, may be equipped with check valves that open only when the pressure in the catalytic chamber falls below a predetermined value.

As hereinbefore stated, the exhaustion of the exhaust gases from the cylinder may be substantially complete, or only partial. In either case, it is preferred that the air inlet pipe $f$ shall be under comparatively low pressure, so that the check valve $f'$ will open only during the later part of the expansion stroke, and the early part of the compression stroke, of the piston. The amount of introduced air is obviously regulated by the diameter of the pipe $f$, or by the pressure with which the air is forced into the cylinder, or both. If the exhaustion of motive fluid gases is approximately complete, the amount of introduced air must be increased; in other words, the smaller the percentage of recirculated and compressed motive fluid gases, the greater the inflow of air. Indeed, with reduced or complete exhaustion of motive fluid gases, this larger percentage of air is necessary, not to oxidize the fuel, but to avoid too high temperature in the catalyst chamber. As hereinbefore stated, only partial exhaustion of the expanded gases is decidedly preferred, since thereby there is secured substantial fuel economy, while affording at least the most satisfactory means for maintaining in the catalyst chamber the required temperature conditions. In fact, this preferred embodiment is of such value and importance that it constitutes an essential part of the process and construction disclosed in my copending application Ser. No. 790,214. However, as above explained, such preferred embodiment is not essential to operativeness, and the subject-matter herein claimed is limited, as above stated, to a process in which the proportion of oxygen-bearing gas to fuel is in and of itself adequate to provide a mixture outside the limits of inflammability of such mixture but still permitting catalytic oxidation of the fuel. Whichever embodiment of the invention may be utilized it is essential that the temperature within the catalyst shall be adequate to oxidize and reduce the catalyst and render it effective to oxidize the fresh fuel and still be outside conditions allowing explosion of gases and vapors under operating conditions. The permissible range of maximum temperature is quite wide. It should not be less than about 600° C. The permissible upper limit is in the neighborhood of 1100° C. and a temperature in between is preferred, as, for example, 850° C., as hereinbefore explained.

While no particular construction of catalyst chamber and catalyst support and no particular catalyst composition are essential to operativeness, the construction that I distinctly prefer offers pronounced advantages. A cylinder 11 of porcelain is enclosed in a casing 10 of stainless steel, which should be enclosed in a cover 9 of insulating material. In this cylinder 11 are packed a series of catalyst supports, which may be of hard alumina. These supports may be of disc form as shown in Fig. 2 and of a diameter corresponding to the internal diameter of the cylinder 11. Each disc 12 is provided with a series of parallel slots 13 which are preferably of rather smaller width than can be accurately shown in the drawing. The discs may be cast or formed under high pressure. Adjacent discs are so positioned that the slots of one disc extend at right angles to the slots of the adjacent discs, forming tiny interstices—which are packed or impregnated with catalytic material, as, for example, copper, chromium, platinum. The alumina catalyst-supporting discs also function as a catalyst. Threaded on the open end of the porcelain cylinder is a head or closure 14, also of porcelain, which, after the cylinder is filled with the catalyst-impregnated discs, is turned as a nut to press the discs into close contact. The closure may be provided along its periphery with an annular flange 14', which directly engages the adjacent supporting disc, leaving a narrow space between the head 14 and such disc. The head 14 is orificed to allow free outflow of oxidized fuel.

The oxygen-bearing gas, which may be oxygen or air, or either, requiring no recirculated gases, is preferably introduced into one end of the catalyst chamber, while the fuel is injected at a locus spaced from the oxygen-admitting end of the cylinder 11 but considerably closer to that end than to the opposite end of the cylinder—say at a distance from the oxygen-admitting end equal to about one-fifth the length of the cylinder. It is preferred to locate in the cylinder 11 a disc 16, also conveniently of porcelain, which is channeled at 17 to connect with the fuel pipe e and which is provided with an opening 18 communicating with the channel 17 and which allows free passage of the oxygen bearing gases to the set of more numerous catalyst supports beyond the disc 16.

The catalyst supports 12—13 and the cylinder 11 should have the same coefficient of expansion (which is practically nil if they are composed of the materials specified).

A decided advantage of the catalyst arrangement above described is that no explosion can take place regardless of the oxygen-content of the fuel-air mixture. Explosion cannot spread within such a catalyst mass. What exists is a series of high burning zones between the catalyst interstices.

The amount of air that is injected into the catalyst chamber should be substantially in excess, say 200 to 300 per cent., of that required for oxidation of the fuel.

It should be again stated that the fresh air may be introduced into the catalyst chamber directly or, as illustrated, initially into the engine cylinder and thence, whether or not admixed with recirculated gases, into the catalyst chamber. Various ways of admitting fuel and air are disclosed in my said copending application Ser. No. 790,214 and need not be here illustrated and described, since such methods of supplying the required air and fuel form no part of my broad invention. As a specific embodiment of my invention, however, I desire to protect the introduction of the oxygen-bearing gas into one end of the head of the catalyst chamber and the introduction of the fuel direct into the catalyst chamber but at a locus spaced from, and relatively near, the locus of admission of the oxygen-bearing gas; and in such specific embodiment the way shown and described for supporting and distributing the catalyst is of importance.

The invention is not limited to the use of any particular catalyst. Any oxidizable material which, when oxidized, effects by contact the oxidation of hydrocarbons or other compounds to $CO_2$, $H_2O$ (or sulfur to $SO_2$, $SO_3$) at temperatures of about 300° C. and above, functions with total efficiency. Examples of metals which may be used are copper, chromium, vanadium, manganese and molybdenum. Among other elements that will function successfully are silver, nickel, cobalt, iron, magnesium, platinum, tungsten, thorium, lead and zinc. Combinations or mixtures of these elements will give a more active catalyst and will effect oxidation and reduction over the widest range of temperature. For example, copper manganese, finely divided, over an activated alumina support effects oxidation at below 300° C., thereby permitting an easy start of the engine. The same catalyst will reduce easily at 500 to 800° C.

The qualities most desirable in the catalyst may be summed up as follows: (1) It should be physically strong and have a definite hardness. (2) Chemically, it should reduce an oxidize readily between 500° and 800° C. For engine starting it should reduce and oxidize readily at lowest possible temperature. (3) The surface for heat exchange, which should be extensive, is given by the support, which may be inert, but is much preferably active, as, for instance, activated alumina, or activated zirconia or silica gel.

When finely divided all these oxidation catalysts in reducing and/or oxidizing atmosphere release nascent oxygen in atomic stage; and this phenomenon explains the rapid oxidation of gases when they are outside conditions allowing explosion of gases and vapors.

The catalysts have an almost indefinitely long life, since there is no problem of regeneration.

While I have specified introducing oxygen into the system by the utilization of air, it will be understood that I may utilize any oxygen-bearing gas, including pure oxygen, which is now available at reasonable cost. If, however, little or no recirculating medium is utilized, the additional gas would be either air or air enriched with nitrogen, or nitrogen.

While the invention herein described is shown as adapted to the operation of a reciprocating piston engine, it is operable to drive a turbine or an engine or motor of any type, whether or not the gaseous mixture used as the motive fluid is in part recompressed and recirculated to the catalyst chamber.

What I claim and desire to protect by Letters Patent is:

A process for generating power wherein a motive fluid is produced by catalytic oxidation of an oxidizable fuel, which comprises introducing fresh oxygen-bearing gas and an oxidizable fuel into a catalytic oxidation zone, supplying fresh oxygen-bearing gas to said zone at a rate so great relative to the rate of supply of said oxidizable fuel as to provide in said catalytic oxidation zone a mixture of fresh oxygen-bearing gas and fuel which is outside the limits of inflammability under operating conditions, and thus not susceptible of spark plug ignition, effecting oxidation of said non-flammable mixture solely by contact of said mixture with an oxidation catalyst at a temperature substantially below ordinary combustion temperatures of flammable mixtures, and utilizing the products of such catalytic oxidation as a motive fluid for the generation of power.

EUGENE J. HOUDRY.

REFERENCES CITED

The following references are of record in the file of this patent:

UNITED STATES PATENTS

| Number | Name | Date |
|---|---|---|
| 1,564,906 | Sokal | Dec. 5, 1925 |
| 1,622,010 | Summer | Mar. 22, 1927 |
| 1,847,260 | Pardee | Mar. 1, 1932 |
| 1,919,626 | Finn | July 25, 1933 |
| 2,259,010 | Taylor | Oct. 14, 1941 |
| 2,288,943 | Eastman | July 7, 1942 |
| 2,315,336 | Karrer | Mar. 30, 1943 |
| 2,404,335 | Whittle | July 16, 1946 |
| 2,433,932 | Stosick | Jan. 6, 1948 |
| 2,433,943 | Zwicky et al. | Jan. 6, 1948 |
| 2,443,841 | Sweeney et al. | June 22, 1948 |

FOREIGN PATENTS

| Number | Country | Date |
|---|---|---|
| 271,899 | Great Britain | Aug. 18, 1927 |